Dec. 9, 1958 Y. BREELLE 2,863,425
SCAVENGING AND SUPERCHARGING SYSTEM FOR ROTARY ENGINES
Filed Dec. 19, 1957 2 Sheets-Sheet 1

INVENTOR
YVES BREELLE

ATTORNEYS

Dec. 9, 1958 Y. BREELLE 2,863,425
SCAVENGING AND SUPERCHARGING SYSTEM FOR ROTARY ENGINES
Filed Dec. 19, 1957 2 Sheets-Sheet 2

INVENTOR
YVES BREELLE
BY Toulmin & Toulmin
ATTORNEYS

United States Patent Office 2,863,425
Patented Dec. 9, 1958

2,863,425

SCAVENGING AND SUPERCHARGING SYSTEM FOR ROTARY ENGINES

Yves Breelle, Rueil-Malmaison, France, assignor to Institut Français du Petrole, des Carburants et Lubrifiants, Paris, France Application December 19, 1957, Serial No. 703,804

Claims priority, application France December 19, 1956

9 Claims. (Cl. 123—13)

This invention relates to a combined system for scavenging and supercharging rotary engines, which is particularly adapted for use with rotary engines of the type having a central rotor which is simultaneously the compression and the power transmitting rotor.

The system according to this invention is particularly suited for use with rotary engines described in my copending patent applications Ser. No. 688,908 filed on October 8, 1957, and Ser. No. 698,291 filed on November 22, 1957. This patent application contains subject matter common to, and described in detail in, the aforesaid patent applications.

It is an object of my invention to provide a combined scavenging and supercharging system for rotary engines which forms an integral part of the engine, thereby avoiding the necessity of a separate power transmission system for the scavenging and supercharging step.

It is another object of my invention to provide a novel scavenging and supercharging system for rotary engines of the above mentioned type, which provides for a better scavenging and in which the scavenging and supercharging effect is achieved more simply, and the resulting stresses due to increased air pressure and engine power are better absorbed by all structural parts of the engine. Supercharging and scavenging systems known in the art usually comprise a separate, independent compressor connected by suitable pipings to the engine and often driven by the latter through a separate power transmission system.

Rotary engines are known in the art, such as, for instance, described in Patent 2,246,235 to B. H. S. Beach, which comprise an air induction rotor, a piston-bearing power rotor, a compressor rotor and a separate scavenging rotor, all of which rotors are arranged in successive order with their shafts parallel to each other and located in a single plane so that no rotor cooperates with more than two other rotors, the power rotor only cooperating by direct engagement with the air induction rotor and the compressor rotor, the latter only directly engaging the power rotor and the scavenging rotor, and the air induction rotor and the scavenging rotor each cooperating only with one other rotor.

A motor-compressor of this type suffers from the drawback that it is too elongated relative to its mass and weight; the proportion of its volume to its surface is unfavorable, and consequently it requires more material and is unduly heavy. It also lacks stability in view of the fact that it is elongated, and requires long pipings or conduits.

In this known arrangement the power rotor in the combustion rotor and main air and fuel intake occur by the former in cooperation with the air intake rotor.

In contrast thereto, in the rotary engines described in my patent applications supra, the power rotor serves as the compression rotor, and fuel and/or air are taken in by that compression rotor, which also cooperates with a sealing rotor the latter serving exclusively for preventing a mixture of fresh gases, for example air, with the waste gases escaping through an adjacent exhaust. Furthermore, the combustion space is either located in a separate combustion rotor or housed in the engine stator and associated with a cooperating gate rotor.

The above mentioned objects are attained and the drawbacks of the known arrangements avoided by the novel combined supercharging and scavenging system according to my invention which forms an integral part of a rotary engine, in the form of at least one auxiliary peripheral or gate rotor and adequate channel means for effecting auxiliary compression of the combustion-sustaining agent or "comburant," such as air, which auxiliary or supercharge gate rotor and channel means are distributed together with the other gate rotors of the rotary engine about the central power rotor of the engine, which power rotor is preferably the compression rotor provided in the rotary engines of the internal combustion type as described in my patent applications supra.

Peripheral or gate rotors are those rotors which are disposed peripherally relative to the piston-bearing central rotor and cooperate with the latter.

According to an important feature of my invention, the pressure of the scavenging and/or supercharging fluid is maintained by the above-mentioned auxiliary gate rotor acting as a check valve which prevents that the aforesaid fluid of elevated pressure escapes back through the central chamber as soon as the compressing piston has passed the transfer channel opening through which the compressed fluid is pressed out of the central chamber.

This arrangement makes unnecessary a complicated system of valves and pipes outside the engine block which would otherwise be required for preventing this undesirable loss of pressure.

Further advantages of my invention will become apparent as the description thereof proceeds in connection with the accompanying drawings, in which.

Figure 4:
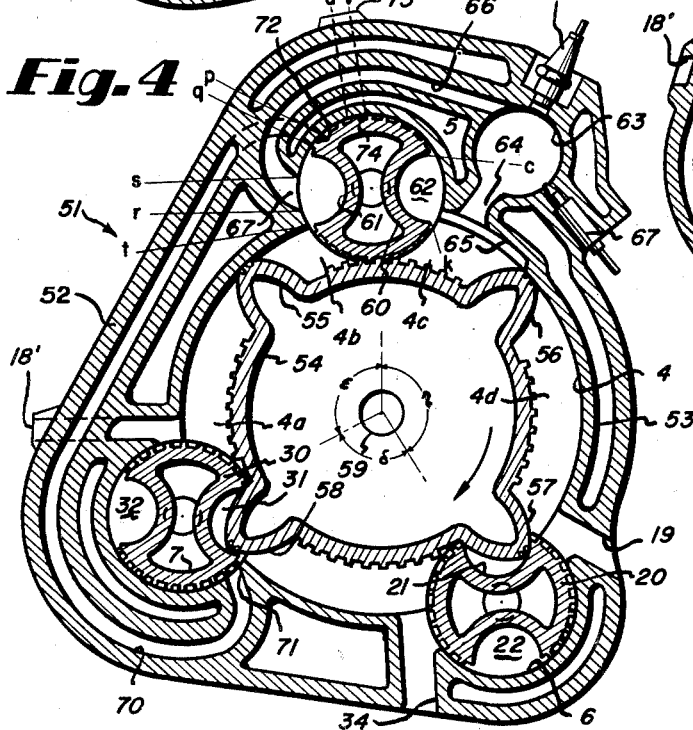
Figure 5:
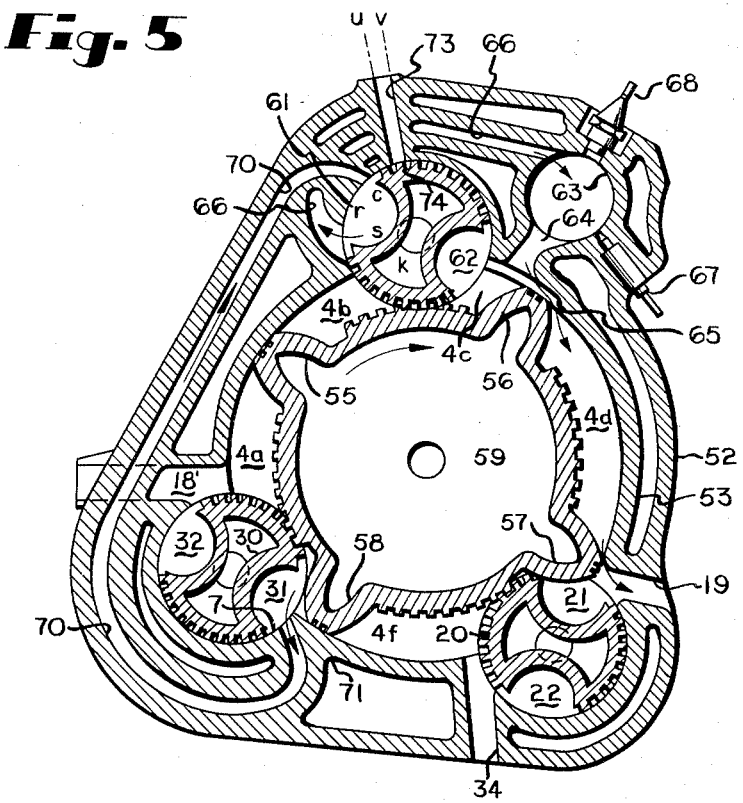
Figure 6:
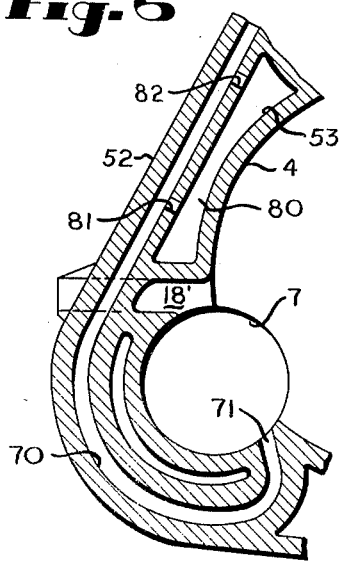
Figure 7:
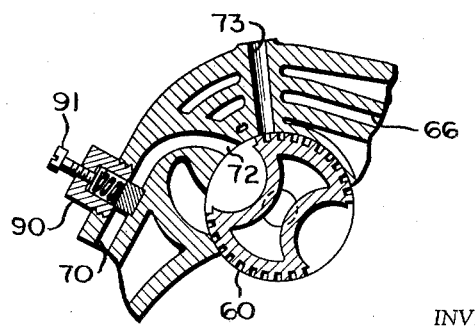

Figure 4 illustrates in cross sectional view an internal combustion rotary engine of the type comprising a central compression and power rotor and a gate rotor associated with a separate combustion chamber housed in the stator of the engine, which engine is provided with fuel injection and electrical controlled ignition means, and furthermore with the supercharging and scavenging system according to the present invention;

Figure 5 shows the same rotary engine as Figure 4, but with the rotors in a different position;

Figure 6 is a fragmentary cross sectional view of a similar embodiment as the rotary engine shown in Figure 4 but provided with an internal reservoir for the supercharge agent;

Figure 7 shows in fragmentary cross sectional view another modification of the supercharging and scavenging system in the region containing the combustion gate rotor.

Figure 1:
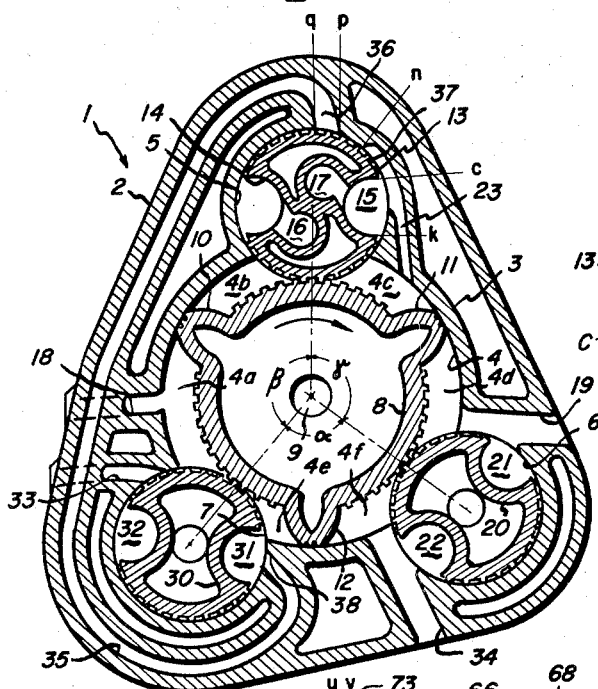
Figure 1 illustrates in cross sectional view an internal combustion rotary engine of the type comprising a central compression and power rotor and a gate rotor housing a pair of combustion chambers and therefore acting as a combustion rotor which engine is provided with the supercharging and scavenging system according to my invention.

Referring now to the drawings more in detail and in particular to Figure 1, reference numeral 1 designates the casing of a rotary engine, of which there shall be described firstly those parts which are in common with the rotary engine described in my patent applications 688,908 and 698,291 supra. Thus, the rotary engine has the outer wall 2 and internal walls 3, the latter enclosing a central bore 4 and peripherally thereto a number of bores or cavities 5, 6 and 7 which open into the central bore 4.

In the latter, a central rotor 8 is mounted for clockwise rotation with the power shaft 9 and is provided with three pistons 10, 11 and 12, which are preferably disposed at angles of 120° relative to each other about the periphery of rotor 8.

Peripheral bore or cavity 5 houses a combustion rotor 13 provided with two wells 14 and 15 diametrically arranged in the outer wall of the rotor 13. The interior of rotor 13 houses two combustion chambers 16 and 17 opening into wells 14 and 15 respectively. This type of combustion rotor is described, for instance, in my patent application Serial No. 688,908 supra.

The diameters of the rotors are so chosen that the rotors may rotate without exercising friction on each other or the walls of the casing.

The casing 1 possesses a main intake port 18 and an exhaust port 19. Central rotor 8 cooperates further with a gate rotor 20 housed in the cavity 6 and provided with diametrically opposed wells 21 and 22. In conjunction with the rotors 13 and 20, the pistons of the central rotor 8 divide the annular free space in central bore 4 into the four compartments 4a, 4b, 4c and 4d corresponding to an intake zone, a compression zone, an expansion or power zone, and an exhaust zone therein.

For the purpose of complementing the combustion and expansion of the explosive power mixture in the engine, a channel 23 is provided in the inner wall 3 of the stator or casing 1 leading from the wall portion enclosing the cavity 5 to the compartment 4c of the central bore 4.

This engine would function essentially as described in my patent application Serial No. 688,908 supra. However, it is further fitted out with the supercharging and scavenging system according to my present invention which comprises a supercharge rotor 30 provided with diametrically opposed wells 31 and 32 and housed in the cavity 7, an auxiliary port 33 for comburant leading to that cavity 7, a second main intake port 34 for comburant, or a fuel-comburant mixture, into the central bore 4 directly, and a channel 35 connecting the cavity 7 of the supercharge rotor 30 with the cavity 5 housing the combustion rotor 13. By the provision of this supercharge rotor 30, the annular internal space of the central bore 4 is subdivided so as to form two further compartments 4e and 4f intermediate the supercharge rotor 30 and the leading slope of a piston approaching the rotor 30, which compartment 4e can be connected by one of the wells of rotor 30 with the channel 35, and compartment 4f intermediate the gate rotor 20 and the trailing slope of another piston moving away from rotor 20. Compartment 4a can be connected with the auxiliary port 33 via one of the wells of rotor 30. The original intake compartment 4a in the engine described in my patent application Serial No. 688,908 supra, is thus subdivided, in the engine according to the present invention, into the three compartments 4a, 4e and 4f.

In the embodiment of Figure 1, the intake port 18 is located relative to the central bore 4 in such a manner that any passage of gas from the intake compartment 4a to the compartment 4e, in which comburant is compressed for supercharging and scavenging purposes, is avoided. This is of importance only if the rotary engine is of the carburetor type, wherein a fuel-air mixture is suctioned in through intake port 18.

The auxiliary port 33 which opens into the surrounding atmosphere helps to avoid that a partial vacuum is produced in the wells of rotor 30 and in the compartment 4a due to the displacement of one of the pistons of the central rotor 8, which depression would augment the resistance to be overcome by the engine, and would cause a loss of scavenging and supercharging pressure, whenever a well of rotor 30 would communicate with compartment 4e.

The intake port 34 for supercharging and scavenging agent opens into the compartment 4f immediately adjacent rotor 20, and the exhaust port 19 is provided on the other side and immediately adjacent that same rotor 20 from compartment 4d to the outside.

If, however, a combustible mixture is admitted through intake port 34 as the scavenging and/or supercharging fluid, then it is preferable to provide intake port 34 at some distance from gate rotor 20 (toward the left in Figure 1) while intake opening 18 may be located directly adjacent rotor 30.

In this case angle $\alpha$ should preferably be larger and angle $\beta$ smaller than in Figure 1.

The channel 35 opens into the cavity 5 with an orifice 36 having the width $p—q$ and being at such distance from the orifice 37 of bypass channel 23 into the same cavity 5 that each well 14 or 15 of rotor 13 establishes free communication between channels 35 and 23 during a determined time interval. In order to achieve this end, the distance $p—n$ in Figure 1 must be shorter than the width $c—k$ of the wells of rotor 13.

The shafts of rotors 13, 20 and 30 are all disposed in parallel with the power shaft 9 and each in a plane common with the power shaft and in such a manner that these planes form angles $\alpha$, $\beta$ and $\gamma$ with each other, the sum of these angles being, of course, 360°.

These angles are so dimensioned that the admission, compression, power-exhaust, and super-charging or scavenging strokes are so adjusted relative to each other that the engine functions with the highest attainable efficiency.

Gate rotors 13, 20 and 30 have diameters equal to two thirds of the diameter of the central rotor 8. External gear means for synchronising the rotation of all rotors, and a starting motor are not illustrated and have been described in detail in my patent applications supra.

The most suitable arrangements of spark plugs and/or injector means, the profiles of the pistons and wells, the sealing means between different rotors and between rotors and the stator, the cooling system of the rotors and the casing can be chosen easily from those described in my patent application Serial Nos. 688,908 and 698,291 supra and 696,538 filed Nov. 14, 1957.

*Operation of embodiment shown in Figure 1*

The operation of the rotary engine of the carburetor type illustrated in Figure 1 is carried out as follows:

It is assumed that the central rotor 8 is set in motion with the aid of a starting motor (not shown) and rotates in clockwise direction. Piston 10 will draw in an explosive mixture from a carburetor (not shown) as soon as its trailing slope has passed the intake port 18 and, upon passage of piston 10 through well 14 of rotor 13, the next following piston 12 will compress this drawn in fuel-air mixture in the compartment 4b, until well 15 communicates with that compartment. Thereupon, the explosive mixture will be further compressed in well 15 and combustion chamber 17.

The explosive mixture is then ignited by a spark plug (not shown) at a suitable time in advance so as to obtain substantially maximum pressure at the instant when the piston reaches its most complete penetration into the corresponding well of rotor 13 which point corresponds to the upper dead center in the classical internal combustion engines.

The expansion of the inflamed gases then exerts its motive force on piston 12 first directly and afterwards through bypass channel 23. Piston 10 is at this time passing intake port 34 and entrains, behind its trailing edge, scavenging and/or supercharging gas through the aforesaid port 34 into compartment 4f, whereupon the next following piston 12 will compress this gaseous fluid in compartment 4e, until one of the wells of rotor 30 establishes free communication between that compartment 4e and the orifice 38 of channel 35.

The gaseous supercharge or scavenging fluid is then compressed in channel 35 until one of the wells in combustion rotor 13 establishes communication between channels 35 and 23. Due to the specific arrangement of the orifices 36 and 37 (respectively) of these channels with regard to each other, this communication between them is only established when the piston, upon the trailing slope of which the expending exploded gases are acting, has opened access to the exhaust port 19. At that instant, the compressed scavenging fluid from channel 35 expels the residual gases from the well in communication with channels 35 and 23, as well as part of those waste gases contained in the combustion chamber (16 or 17), from channel 23 and eventually compartment 4c of the central bore 4 through exhaust port 19, until the rotation of rotor 13 cuts off the communication between channels 23 and the well in question. Communication between the latter well and channel 35 continues for a short interval longer and the well is filled with gaseous fluid at supercharge pressure. The amount of this supercharge fluid determines the richer or poorer composition of the explosive mixture in compartment 4b, as the last mentioned well establishes communication therewith and the resultant mixture is further compressed in the corresponding combustion chamber as one of the pistons advances into the same well.

Figure 2:
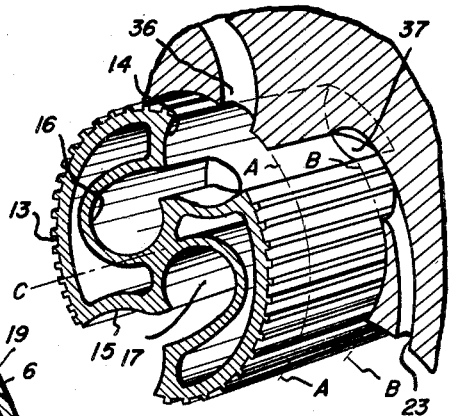
Figure 2 is a fragmentary view in perspective of a portion of Figure 1 showing a different arrangement of the channel means.

As shown in Figure 2, the orifices 36 and 37 of channels 35 and 23, respectively, in the cavity 5 housing the combustion rotor 13, can be disposed in different planes A—A and B—B perpendicular to the central axis C—C of that rotor. This has the advantage of bringing about a better scavenging effect of the wells (14, 15) of rotor 13 of the combustion chambers (16, 17) and the channel 23 in axial direction.

Figure 3:
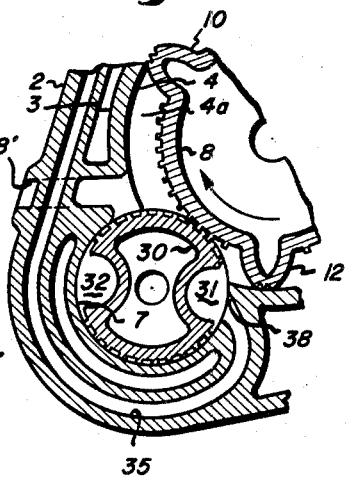
Figure 3 is a cross sectional fragmentary view of the region of Figure 1 containing the auxiliary supercharge and/or scavenging rotor.

While the embodiment of the rotary engine provided with a supercharging and scavenging system according to my present invention is well suited for rotary internal combustion engines of the carburetor type, use of the same system with engines of the fuel injection and auto-ignition, or fuel injection and controlled injection type, permits certain simplifications and improvements, in particular of the arrangement of the main intake port. These are shown in Figure 3 being a partial sectional view of the portion of the engine comprising the supercharge rotor 30. In this Figure 3, like parts as in Figure 1, are designated by like numerals. The conduit 33 is omitted and intake port 18' is located directly adjacent supercharge rotor 30. Thereby, the effective length of compartment 4a from port 18' to the trailing edge of the piston moving towards the combustion rotor 13 is considerably lengthened.

Recycling of some gaseous fluid (air in this case) through the wells of rotor 30 into the compartment 4e causes no inconvenience in this instance.

Figure 4 illustrates another embodiment of a rotary engine, of the fuel injection and auxiliary ignition type, as described in detail in my patent application Serial No. 698,291 supra, and provided with the supercharging and scavenging system according to the present invention. Again parts identical with those shown in Figure 1 are designated by the same reference numerals.

The central rotor chamber or central bore 4, rotor cavities 5, 6 and 7, and intake ports 18' and exhaust port 19, are enclosed by the internal walls 53 of engine casing or stator 51 which also comprises the outer wall 52.

The central rotor 54 is provided with four pistons 55, 56, 57 and 58, adapted to pass free from friction through the wells 21 and 22 of gate rotor 20, wells 31 and 32 of supercharge rotor 30, and wells 61 and 62 of combustion gate rotor 60. The latter controls the function of the separate stationary combustion chamber 63 which is provided in the stator 51 and opens with a wide throat portion 64 into a recess 65 in wall 53 which establishes free communication of the combustion chamber 63 with compartment 4c of the central bore 4.

One well of that rotor 60 is at certain times in communication with the combustion chamber 63 through a channel 66 leading from an opening 67 of the width r—s in the wall of cavity 5 to the combustion chamber 63 and opens into the latter tangentially to its approximately circular cross section.

Shaft 59 of central rotor 54 and the shafts of rotors 20, 30 and 60 are arranged parallel with each other in different planes designated by phantom lines in Figure 4. These planes contain always the shaft 59 and the shaft of one of the other rotors and form with each other angles $\delta$, $\epsilon$ and $\eta$, whereby the engine can operate with the best achievable efficiency.

The combustion chamber 63 is arranged with its central transverse plane being preferably the central cross sectional plane of the central bore 4 perpendicular to the shaft 59. Injector means 67 and electrical sparking means 68 protrude into the combustion chamber 63 from the outer wall 52 of the engine, the injector means 67 being so arranged as to inject a fuel jet into the combustion chamber 63 from the wall portion thereof opposite the mouth of channel 66 toward the latter and past the sparking means 68.

This rotary engine is fitted out, as an integral part thereof, with the supercharge and scavenging system according to the present invention which comprises, apart from the above mentioned supercharge rotor 30 in cavity 7, a channel 70, leading from orifice 71 in the wall of cavity 7 through the stator to orifice 72 having width p—q in the cavity 5 housing the combustion gate rotor 60; and furthermore secondary intake 34 and an outlet conduit 73 leading from the orifice 74 of width u—v in the wall of cavity 5 to the outside of the engine stator 52.

The position of orifice 71 of channel 70 in the wall of cavity 7 is substantially the same as in the embodiment illustrated in Figure 1. However, the other orifice 72 of channel 70 is located differently in the cavity 5, than is the case in the embodiment of Figure 1.

Viewed projected in a plane transverse to the rotor axes, as is the case in Figure 4, this orifice 72 is located between the orifice 67 of channel 66 and the orifice 74 of channel 73, so that each well 61, 62 of rotor 60 can successively establish communication between channels 70 and 73, and thereafter between channels 70 and 66, the distances between the orifices 74, 72, 67, and compartment 4b being, however, so dimensioned that the wells 61 or 62 cannot establish communication between channels 66 and 73, or between channel 70 and compartment 4b. This is assured by the distances u—p and q—s in Figure 4, i. e. the projections of the distances between orifices 72 and 74, as well as between orifices 67 and 72, onto the plane of Figure 4, are shorter than the width c—k of the wells 61, 62; and that, on the other hand, the distances u—s and q—t, i. e., the projections, onto the plane of Figure 4, of orifices 67 and 74, as well as of channel 70 from compartment 4b, are larger than the width c—k of the aforesaid wells.

Where the channel 73 is omitted, it is sufficient that the above distance q—s is shorter, and distance q—t is larger than the above width c—k of wells 61, 62.

*Operation of embodiment shown in Figure 4*

This embodiment of a rotary engine fitted with the supercharging and scavenging systems according to my invention functions in the following manner:

After a portion of combustion-sustaining agent or "comburant" has been suctioned into the compartment 4a via intake port 18', for instance, by the trailing slope of piston 56, this gaseous portion is compressed between the leading slope of piston 55 and the wall of rotor 60 in compartment 4b.

As well 61 establishes communication of the latter compartment with channel 66, the compressed comburant occupies the aforesaid well and channel as well as the combustion chamber 63, throat 64 thereof, and compartment 4c of the central chamber.

Fuel is then injected and ignited, and combustion takes place at a constant volume, the volume of compartment 4c increasing by the same amount by which the volume of compartment 4b decreases, until upon further rotation of rotor 60, the trailing edge of well 61 cuts off communication between compartment 4b and channel 66.

Expansion of the entire burnt gas volume takes place as described in detail in my patent application Serial No. 698,291 supra, and piston 56 is subjected to propulsive forces due to this expansion. Recess 65 contributes to a prolonged and more effective expansion of the gases, and permits direct communication of compartment 4c via compartment 4d with the exhaust port 19 during a short time interval prior to scavenge these spaces prior to combustion.

The scavenging system in this embodiment of my invention functions as follows:

Air is taken in through port 34 and compartment 4f and subsequently compressed in compartment 4e shortly before, for instance, piston 58 reaches the position shown in Figure 4, whereupon the air supercharge is forced through well 31 and channel 70 into well 61.

While this well 61 maintains briefly communication between channels 70 and 73, residual gases are scavenged therefrom. Then, as the rotors of the engine arrive at the positions illustrated in Figure 5, the channels 70 and 66 are brought into communication and the entire combustion space is scavenged, free communication existing via spaces 61, 66, 63, 65 and 4d to exhaust port 19 of the engine.

Shortly after the position of Figure 5 and shortly prior to the position shown in Figure 4, the passage of the scavenged gases and scavenging agent past piston 56 through 65 is interrupted, the exact instant depending on the length of that recess 65 in the direction of rotation of the pistons. Thereafter and until the trailing edge of well 31 of rotor 30 cuts off communication to channel 70, the partial combustion space comprising spaces 61, 66, 63, 62 and 4c is supercharged with compressed comburant from well 31 via channel 70.

Subsequently, at or shortly after the position of the rotors illustrated in Figure 4, the normal filling of the combustion spaces with compressed comburant (for instance, air) is achieved, as well 61 or 62 of rotor 60 establishes communication between compartment 4b and channel 66.

In a further embodiment of the supercharging and scavenging system according to the invention illustrated in Figure 6, part of the space occupied, for instance, by the cooling spaces provided in the stator could be used for housing a reservoir 80 being in communication with channel 70 through a number of orifices 81, 82. This reservoir 80 must have sufficient capacity to dampen the pulsations or shock waves of pressure changes occurring in channel 70 by providing an air cushion for that channel.

This same result can be achieved by providing channel 70 with a sufficiently large cross sectional area.

Furthermore, as illustrated in Figure 7, a clack valve or spring loaded valve 90 which is adjustable to the desired scavenging or supercharging pressure is inserted in channel 70 near the orifice 72 thereof, and can be adjusted from the outside of the stator by conventional adjusting means 91.

The basic supercharging and scavenging system according to the invention, described hereinbefore, as applied to two different rotary engines, is equally applicable to all rotary engines in which the compression of a gaseous medium is carried out by the displacement of at least one piston of a central rotor in a chamber formed between that rotor and the wall of a stator bore housing the same, regardless of the number of pistons of the central rotor, the number of gate rotors peripherally associated with the central rotor, and the number of wells in the peripheral rotors.

Moreover, regardless of the type of rotary engine as described, in which the supercharging and scavenging system according to the invention is employed, a determined supercharge and scavenging pressure can be obtained by selecting in the construction of the engine the appropriate angle ($\alpha$ in Figure 1 and $\sigma$ in Figure 4) between the peripheral locations of rotors 20 and 30, i. e. of the intake exhaust separating rotor and the supercharge rotor relative to the central rotor.

The supercharge and scavenging pressure will be the greater, the larger the angle between the planes containing the axis of the one or the other of rotors 20 and 30, and the axis of the central rotor.

Apart from the above described purposes, the compressed gas from the system, according to the invention, may also be used for cooling the stator and/or the rotors of the rotary engine by directing the gas into the internal cooling spaces provided therein.

It will be understood that this invention is susceptible to modification in order to adapt it to different usages and conditions and, accordingly, it is desired to comprehend such modifications within this invention as may fall within the scope of the appended claims.

I claim:

1. In a rotary internal combustion engine of the type described and having a stator, a central chamber therein and a number of cavities peripherally opening into said chamber, a power shaft extending through said central chamber, a central rotor, said central rotor being rotatably mounted on said shaft in said central chamber, a plurality of pistons projecting from the peripheral wall of said central rotor and adapted for taking in, compressing, and releasing gaseous fluid in a normal work cycle, a number of gate rotors peripherally disposed about said central rotor and having wells for the passage of said pistons therethrough, and each housed with its rotary axis parallel with said power shaft in one of said stator cavities, a combustion space in said engine comprising at least one combustion chamber, one of said gate rotors being associated with said combustion chamber for controlling the admission of gaseous fluid thereto; the improvement of a supercharging and scavenging system comprising, in combination, an auxiliary gate rotor for controlling a second, separate compression of fluid for supercharging and scavenging purposes, apart separately from the compression of gaseous fluid in said normal work cycle, said auxiliary gate rotor being housed in one of said cavities; and channel means leading from said cavity housing said auxiliary gate rotor to the cavity housing said rotor associated with said combustion chamber, all of said peripheral gate rotors including said auxiliary gate rotor being distributed at determined angles taken at said power shaft, about the periphery of said central rotor.

2. In a rotary internal combustion engine of the fuel-injection type and having a stator, a central chamber therein and a number of cavities peripherally opening into said chamber, a power shaft extending through said central chamber, a central rotor, said central rotor being rotatably mounted on said shaft in said central chamber, a plurality of pistons projecting from the peripheral wall of said central rotor, and adapted for taking in, compressing, and releasing gaseous comburant in a normal work cycle, a number of gate rotors peripherally disposed about said central rotor and having wells for the passage of said pistons therethrough, and each being housed in one of said stator cavities with its rotary axis in parallel with said power shaft, a combustion space in said engine comprising a combustion chamber in said stator, one of said gate rotors being associated with said combustion chamber for controlling the admission of comburant thereto, fuel-injection and ignition means in said combustion chamber and combustion channel means connecting the cavity housing said last named rotor with said combustion chamber; the improvement of a supercharging and scavenging system comprising, in combination, an auxiliary gate rotor for controlling a second, separate compression of comburant for supercharging and scavenging purposes, apart from the compression of comburant in said normal work cycle, said auxiliary gate rotor being housed in one of said cavities; scavenging channel means leading from said cavity housing said auxiliary gate rotor to the cavity housing said rotor associated with said combustion chamber; and conduit means leading from said cavity housing said rotor associated with said combustion chamber to the outside of the engine stator, said combustion channel means, said scavenging channel means and said conduit means opening into said last-mentioned cavity at such distances from where said cavity opens into said central chamber that one of the wells of said rotor associated with said combustion chamber successively establishes free communication first between said conduit means and said scavenging channel means, then between the latter and said combustion channel means, and thirdly between said combustion channel means and said central chamber; all of said peripheral gate rotors including said auxiliary gate rotor being distributed at determined angles taken at said power shaft, about the periphery of said central rotor.

3. In a rotary internal combustion engine of the carburetor type and having a stator, a central chamber therein and a number of cavities peripherally opening into said chamber, a power shaft extending through said central chamber, a central rotor, said central rotor being rotatably mounted on said shaft in said central chamber, a plurality of pistons projecting from the peripheral wall of said central rotor and adapted for taking in, compressing, and releasing gaseous fluid in a normal work cycle, a number of gate rotors peripherally disposed about said central rotor and having wells for the passage of said pistons therethrough, and each housed with its rotary axis parallel with said power shaft in one of said stator cavities, a combustion gate rotor containing at least one combustion chamber in the rotor interior in free communication with a well in the peripheral wall of the rotor, said combustion gate rotor being adapted for controlling the admission of gaseous fluid to, and the exit of the resulting combustion products from said combustion chamber; the improvement of a supercharging and scavenging system comprising, in combination, an auxiliary gate rotor for controlling a second, separate compression, in said central chamber, of gaseous fluid for supercharging and scavenging purposes, apart from the aforesaid compression of gaseous fluid in said normal work cycle, said auxiliary gate rotor being housed in one of said stator cavities; and channel means leading from said cavity housing said auxiliary gate rotor to the cavity housing said combustion gate rotor, and permitting the passage of compressed gaseous fluid therethrough into a well and into the combustion chamber communicating therewith of said combustion gate rotor, when said well establishes communication with said channel means, so as to scavenge and supercharge said combustion chamber; all of said gate rotors including said auxiliary gate rotor and said combustion gate rotor being distributed under determined angles relative to each other, taken at said power shaft, about the periphery of said central rotor.

4. The improvement as described in claim 1, wherein valve means are provided in said channel means for controlling the passage of compressed gaseous fluid therethrough.

5. The improvement as described in claim 1, further comprising a reservoir for compressed gaseous fluid inside said stator and port means connecting said reservoir with said channel means of said supercharging and scavenging system.

6. In a rotary internal combustion engine having a stator provided with a central bore and a plurality of cavities peripherally opening into said bore, a central rotor coaxially arranged in said central bore and bearing a plurality of rotary pistons, and a plurality of gate rotors, one in each of said cavities and arranged with their central axes parallel with the central axis of said central rotor and dividing the annular space between the body of said central rotor and said central bore into compartments sealed off from one another, each of said gate rotors being provided with wells for the passage of said pistons therethrough, at least one of these gate rotors being continuously associated with at least one combustion chamber and with a channel for combustion-sustaining gaseous fluid under pressure, said channel opening into the cavity housing said last-mentioned rotor at a determined region, whereby the gaseous fluid under pressure contained therein can successively scavenge burnt gases from the combustion space of the engine comprising said combustion chamber, and supercharge said combustion space by filling the same with said gaseous fluid under pressure, the improvement consisting in that the compression space in which said gaseous fluid is brought to the required scavenging and supercharging pressure, is located in a portion of said annular space in said central bore intermediate two of said gate rotors other than that gate rotor which is continuously associated with said combustion chamber.

7. In a rotary internal combustion engine having a stator provided with a central bore and a plurality of cavities peripherally opening into said bore, a central rotor coaxially arranged in said central bore and bearing a plurality of rotary pistons, and a plurality of gate rotors, one in each of said cavities and arranged with their central axes parallel with the central axis of said central rotor and dividing the annular space between the body of said central rotor and said central bore into compartments sealed off from one another, each of said gate rotors being provided with wells for the passage of said pistons therethrough, at least one of these gate rotors being continuously associated with at least one combustion chamber and with a channel for combustion-sustaining gaseous fluid under pressure, said channel opening into the cavity housing said last-mentioned rotor at a determined region, whereby the gaseous fluid under pressure contained therein can successively scavenge burnt gases from the combustion space of the engine comprising said combustion chamber, and supercharge said combustion space by filling the same with said gaseous fluid under pressure, the improvement consisting in that the compression of said gaseous fluid is brought to the required scavenging and supercharging pressure by the displacement of said rotary piston in a compression space which is located in a portion of said annular space in said central bore intermediate two of said gate rotors other than that gate rotor which is continuously associated with said combustion chamber.

8. In a rotary internal combustion engine having a stator provided with a central bore and a plurality of cavities peripherally opening into said bore, a central rotor coaxially arranged in said central bore and bearing a plurality or rotary pistons, and a plurality of gate rotors, one in each of said cavities and arranged with their central axes parallel with the central axis of said central rotor and dividing the annular space between the body of said central rotor and said central bore into compartments sealed off from one another, each of said gate rotors being provided with wells for the passage of said pistons therethrough, at least one of these gate rotors being continuously associated with at least one combustion chamber and with a channel for combustion-sustaining gaseous fluid under pressure, said channel opening into the cavity housing said last-mentioned rotor at a determined region, whereby the gaseous fluid under pressure contained therein can successively scavenge burnt gases from the combustion space of the engine comprising said combustion chamber, and supercharge said combustion space by filling the same with said gaseous fluid under pressure, the improvement consisting in that the compression space in which said gaseous fluid is brought to the required scavenging and supercharging pressure, is located in a portion of said annular space in said central bore intermediate two of said gate rotors other than that gate rotor which is continuously associated with said combustion chamber and that the communication between said compression space in said annular space and said channel is established by means of the wells of that one of said gate rotors at which said gaseous fluid attains the required scavenging and supercharging pressure.

9. The improvement as described in claim 3, which is further characterised in that a portion of said annular space in said central bore which is destined for the intake and compression of the gases to be introduced into said combustion space in the normal work cycle of the engine, is located intermediate said gate rotor at which said gaseous fluid attains the required scavenging and supercharging pressure and said rotor associated with said combustion chamber, and that said intake portion comprises an intake port which opens thereinto spacedly relative to said former rotor so as to prevent the gases introduced into said intake portion from penetrating into the wells of said former rotor; and that an exhaust channel adjacent said former rotor connects the wells of the latter with the outside so as to equilibrate the pressure in said wells with that of the outside.

No references cited.